United States Patent
Yamaguchi et al.

(10) Patent No.: US 8,102,622 B2
(45) Date of Patent: Jan. 24, 2012

(54) PERPENDICULAR MAGNETIC WRITE HEAD, METHOD OF MANUFACTURING THE SAME AND METHOD OF FORMING MAGNETIC LAYER PATTERN

(75) Inventors: Atsushi Yamaguchi, Tokyo (JP); Michitaka Nishiyama, Tokyo (JP); Shin Narushima, Tokyo (JP); Hiromichi Umehara, Tokyo (JP); Makoto Sato, Tokyo (JP); Tatsuhiro Nojima, Tokyo (JP)

(73) Assignee: TDK Corporation, Tokyo (JP)

( * ) Notice: Subject to any disclaimer, the term of this patent is extended or adjusted under 35 U.S.C. 154(b) by 520 days.

(21) Appl. No.: 12/318,645

(22) Filed: Jan. 5, 2009

(65) Prior Publication Data

US 2010/0172054 A1     Jul. 8, 2010

(51) Int. Cl.
*G11B 5/127* (2006.01)
(52) U.S. Cl. ........... 360/125.03; 360/125.3; 360/125.14; 360/125.02; 360/125.12; 360/125.01
(58) Field of Classification Search ............ 360/125.03, 360/319, 125.13, 125.3, 125.14, 125.12, 360/125.02, 125.01
See application file for complete search history.

(56) References Cited

U.S. PATENT DOCUMENTS

| | | | |
|---|---|---|---|
| 4,974,110 | A | 11/1990 | Kanamine et al. |
| 6,687,084 | B2 | 2/2004 | Takahashi et al. |
| 7,212,379 | B2 | 5/2007 | Hsu et al. |
| 7,433,152 | B2 | 10/2008 | Watabe et al. |
| 7,457,080 | B2 | 11/2008 | Watabe et al. |
| 2006/0002021 | A1 | 1/2006 | Li et al. |
| 2007/0195457 | A1 | 8/2007 | Matono et al. |
| 2007/0245557 | A1 * | 10/2007 | Baer et al. ............. 360/123 |
| 2008/0297953 | A1 | 12/2008 | Matono et al. |

FOREIGN PATENT DOCUMENTS

JP     A-2-66710     3/1990

* cited by examiner

*Primary Examiner* — Thong Q Le
(74) *Attorney, Agent, or Firm* — Oliff & Berridge, PLC

(57) ABSTRACT

In a perpendicular magnetic write head manufacturing method a magnetic layer is formed on a substrate. On the magnetic layer, first and second nonmagnetic layers are formed with different materials. A mask pattern is formed on the second nonmagnetic layer, and the second nonmagnetic layer in a region not covered with the mask pattern is removed. Thereby, the patterned second nonmagnetic layer is formed while leaving the first nonmagnetic layer. The mask pattern is removed and a milling process is selectively performed on the first nonmagnetic layer and the magnetic layer with the patterned second nonmagnetic layer as a mask to remove all of the first nonmagnetic layer in an exposed region and to dig down the magnetic layer in the exposed region, thereby forming a main magnetic pole layer having an inclined part whose thickness decreases with distance from an edge position of the patterned second nonmagnetic layer.

15 Claims, 8 Drawing Sheets

PERPENDICULAR MAGNETIC WRITE HEAD, METHOD OF MANUFACTURING THE SAME AND METHOD OF FORMING MAGNETIC LAYER PATTERN

BACKGROUND OF THE INVENTION

1. Field of the Invention

The present invention relates to a perpendicular magnetic write head having at least an induced magnetic transducer for recording, a method of manufacturing the same, and a method of forming a magnetic layer pattern.

2. Description of the Related Art

In recent years, as surface recording density of a magnetic recording medium such as a hard disk (hereinbelow, simply called "recording medium") improves, improvement in the performance of a thin film magnetic head mounted on a magnetic recording apparatus such as a hard disk drive is in demand.

As recording methods of the thin film magnetic head, a longitudinal recording method of setting the direction of a signal magnetic field to the in-plane direction (longitudinal direction) of a recording medium and a perpendicular recording method of setting the direction of a signal magnetic field to a direction orthogonal to the surface of a recoding medium are known. Recently, the perpendicular recording method is widely employed in place of the conventional longitudinal recording method for the following reason. In the perpendicular recording method, advantages are obtained such that higher line recording density is obtained and a recording medium on which data is recorded is not easily influenced by heat fluctuation.

A thin film magnetic head of the perpendicular recording method (hereinbelow, simply called "perpendicular magnetic write head") has a thin film coil for generating a magnetic flux and a main magnetic pole layer for guiding the magnetic flux generated by the thin film coil to a recording medium.

A perpendicular magnetic recording head in which the main magnetic pole layer extends in the direction crossing the air bearing surface is known. The head structure of this kind is generally called a "single magnetic pole head". A single magnetic pole head in which an auxiliary magnetic pole layer for supplying magnetic flux is provided as well as a main magnetic pole layer in order to increase the intensity of a magnetic field (perpendicular magnetic field) for recording is developed (refer to, for example, Japanese Unexamined Patent Application Publication Nos. H02-066710 and 2002-197615). However, it is said that the single magnetic pole head has limitation in improvement in the recording density of a recording medium.

Recently, a perpendicular magnetic write head having a write shield layer for capturing a spread component of a magnetic flux emitted from a main magnetic pole layer in order to further improve recording density is becoming mainstream. The head structure of this kind is generally called a "shield head". A shield head in which a write shield layer is disposed on the trailing side of the main magnetic pole layer is developed (refer to, for example, U.S. Pat. No. 4,974,110 specification and European patent application publication No. 0360978 specification).

In particular, another shield head is also developed in which, to suppress unintentional erasure of information recorded on a magnetic recording medium at the time of recording, an auxiliary magnetic pole layer is provided on the trailing side of a main magnetic pole layer (refer to, for example, U.S. Pat. Nos. 7,433,152 and 7,457,080 specifications).

Higher recording performance of the perpendicular magnetic recording head is in increasing demand. In consideration of this situation, recently, new proposals are being made as measures to improve the recording performance. For example, an attempt is made to reduce a leak magnetic flux and to improve the intensity of a recording magnetic field arriving at a magnetic recording medium by forming a main magnetic pole layer including an inclined face obtained by gradually decreasing the thickness of the main magnetic pole layer toward a recording medium facing surface (refer to, for example, Japanese Unexamined Patent Application Publication No. 2005-293822).

SUMMARY OF THE INVENTION

However, the shape of the main magnetic pole layer largely exerts an influence on the recording performance of a perpendicular magnetic write head. Therefore, at the time of forming the main magnetic pole layer including the inclined face, to obtain desired recording performance, it is necessary to control the formation position and the angle of the inclined face with high precision. Recently, as recording density is increasing, more severe demand for dimension precision of the main magnetic pole layer will be expected. However, it is considered that the forming method disclosed so far is difficult to sufficiently address the demands of higher dimension precision.

It is desirable to provide a perpendicular magnetic write head including a main magnetic pole layer having higher-precision dimension and a method of manufacturing a perpendicular magnetic write head capable of relatively easily manufacturing such a perpendicular magnetic write head.

It is also desirable to provide a method of forming a magnetic layer pattern capable of processing a magnetic layer at higher precision.

A method of manufacturing a perpendicular magnetic write head according to an embodiment of the present invention includes the following (A1) to (A4).

(A1) Forming a magnetic layer on a substrate.

(A2) Forming a first nonmagnetic layer and a second nonmagnetic layer in order on the magnetic layer, with different materials.

(A3) Forming a first mask pattern on the second nonmagnetic layer and removing, through a first etching process, the second nonmagnetic layer in a region which is not covered with the first mask pattern, thereby forming a pattern of the second nonmagnetic layer while leaving the first nonmagnetic layer.

(A4) Removing the first mask pattern, and selectively performing a first milling process on the first nonmagnetic layer and the magnetic layer with the pattern of the second nonmagnetic layer as a mask, so as to remove all of the first nonmagnetic layer in an exposed region which is not covered with the pattern of the second nonmagnetic layer and to dig down the magnetic layer in the exposed region, thereby forming a main magnetic pole layer having an inclined part which is getting thinner with distance from an edge position of the pattern of the second nonmagnetic layer.

In the method of manufacturing the perpendicular magnetic write head according to the embodiment of the present invention, the pattern of the second nonmagnetic layer is formed on the first nonmagnetic layer covering the magnetic layer which will become the main magnetic pole layer later. After that, the second nonmagnetic layer is used as a mask and the magnetic layer is milled together with the first nonmagnetic layer. Consequently, the first nonmagnetic layer functions as a sacrifice layer at the time of performing the milling process, and the start point position of the inclined part of the main magnetic pole layer to be formed is positioned at high precision. That is, in the main magnetic pole layer, a step between the top face (inclined surface) of the inclined part and the top face of the flat part coupled to the inclined part is difficult to appear. In addition, when the first nonmagnetic layer functions as a sacrifice layer, and thereby the position in the depth direction of the face to be etched and the inclined angle can be also easily controlled. Therefore, the inclined surface in the main magnetic pole layer is formed to have a desired inclination angle in a desired position. As a result, leak magnetic flux is reduced in the recording operation, and the main magnetic pole layer capable of emitting the recording magnetic field of higher magnetic flux density is formed.

A perpendicular magnetic write head according to an embodiment of the present invention has a recording medium facing surface that faces a magnetic recording medium and records magnetic information onto the magnetic recording medium. The perpendicular magnetic write head has a main magnetic pole layer for guiding a magnetic flux to a magnetic recording medium, and a stack structure. The main magnetic pole layer has an one end exposed from the recording medium facing surface and includes an inclined part whose thickness increases with distance from the recording medium facing surface, and a flat part coupled to the inclined part on a side opposite to the recording medium facing surface. The stack structure is disposed in a position closest to the recording medium facing surface, on the flat part of the main magnetic pole layer, and includes a first nonmagnetic layer and a second nonmagnetic layer made of material kinds different from each other in order from a side of the main magnetic pole layer.

In the perpendicular magnetic write head according to the embodiment of the invention, the main magnetic pole layer includes an inclined part and a flat part in order from the side of the recording medium facing surface. The stack structure disposed in a position closest to the recording medium facing surface includes first and second nonmagnetic layers made of different materials. Consequently, the start point position of the inclined part of the main magnetic pole layer (the position of the point at which the top face (inclined face) of the inclined part and the top face of the flat part in the man magnetic pole layer are in contact) is positioned with high precision. That is, in the manufacturing process, by using the second nonmagnetic layer as a mask and etching the main magnetic pole layer together with the first nonmagnetic layer, the first nonmagnetic layer functions as a sacrifice layer. Therefore, a step between the inclined surface and the top face of the flat part is difficult to appear. In addition, since the first nonmagnetic layer functions as a sacrifice layer, the position in the depth direction of the surface to be etched and the inclination angle can be also easily controlled. Therefore, the inclined surface in the main magnetic pole layer has a desired inclination angle in a desired position. As a result, a leak magnetic flux can be reduced in the recording operation, and the recording magnetic field having higher magnetic flux density can be emitted.

A method of forming a magnetic layer pattern according to an embodiment of the present invention includes the following (B1) to (B3).
(B1) Forming a first nonmagnetic layer and a second nonmagnetic layer in order on a magnetic layer, with different materials.
(B2) Forming a mask pattern on the second nonmagnetic layer and removing, through an etching process, the second nonmagnetic layer in a region which is not covered with the mask pattern, thereby forming a pattern of the second nonmagnetic layer while leaving the first nonmagnetic layer.
(B3) Removing the mask pattern and, after that, selectively performing a milling process with the pattern of the second nonmagnetic layer as a mask on the first nonmagnetic layer and the magnetic layer, so as to remove all of the first nonmagnetic layer in an exposed region which is not covered with the pattern of the second nonmagnetic layer and to dig down the magnetic layer in the exposed region.

In the method of forming the magnetic layer pattern according to the embodiment of the present invention, the pattern of the second nonmagnetic layer is formed on the first nonmagnetic layer covering the magnetic layer. After that, the pattern of the second nonmagnetic layer is used as a mask and the magnetic layer is milled together with the first nonmagnetic layer. Consequently, the first nonmagnetic layer functions as a sacrifice layer at the time of performing the milling process, and the boundary position between a region to be etched and a region which is not etched in the magnetic layer is positioned at high precision. Moreover, the position in the depth direction of the face to be etched in the magnetic layer and the inclined angle can be easily controlled.

In the method of manufacturing the perpendicular magnetic write head and the method of forming the magnetic layer pattern according to the embodiments of the invention, preferably, the first nonmagnetic layer is made of a metal, the second nonmagnetic layer is made of an insulting material, reactive ion etching is performed as (first) etching process, and ion milling is performed as (first) milling process. Preferably, etching rate in the (first) milling process of the first nonmagnetic layer is lower than that of the magnetic layer. Preferably, the second nonmagnetic layer is made of a material whose etching rate in the (first) etching process is higher than that of the first nonmagnetic layer by ten or more times. Concretely, it is preferable that the magnetic layer be made of a metal magnetic material containing at least one of iron, nickel, and cobalt, the first nonmagnetic layer be made of a metal containing at least one of ruthenium and chromium, and the second nonmagnetic layer be made of an insulating material containing aluminum oxide.

The method of manufacturing the perpendicular magnetic write head according to the embodiment of the present invention may further include: forming an insulating layer so as to cover at least the inclined part of the main magnetic pole layer; forming a second mask pattern having an opening in a region corresponding to the pattern of the second nonmagnetic layer and covering the other region; removing, through a second etching process, the insulating layer and the pattern of the second nonmagnetic layer in the region which is not covered with the second mask pattern; exposing the main magnetic pole layer by selectively removing the first nonmagnetic layer by second milling process with the second mask pattern as a mask; and removing the second mask pattern and forming a write shield layer and an auxiliary magnetic pole layer, the write shield layer covers a region corresponding to the inclined part of the main magnetic pole layer, in the insulating layer, and the auxiliary magnetic pole layer is isolated from the write shield layer to cover an exposed surface of the main magnetic pole layer. In this case, wet etching or reactive ion etching may be performed as the second etching process, and ion milling may be performed as the second milling process.

In the perpendicular magnetic write head according to the embodiment of the present invention, preferably, the main magnetic pole layer is made of a metal magnetic material containing at least one of iron, nickel, and cobalt, the first nonmagnetic layer is made of a metal containing at least one of ruthenium and chromium, and the second nonmagnetic layer is made of an insulating material containing aluminum oxide. In particular, it is preferable that the second nonmagnetic layer be made of a material whose etching rate in wet etching process and reactive ion etching process is higher than that of the first nonmagnetic layer by ten or more times. The perpendicular magnetic write head may further include: an insulating layer covering at least the inclined part; a write shield layer covering a region corresponding to the inclined part of the main magnetic pole layer, on the insulating layer; and an auxiliary magnetic pole layer isolated from the write shield layer and coupled to the main magnetic pole layer on the side opposite to the recording medium facing surface, of the stack structure.

Other and further objects, features and advantages of the invention will appear as needed in the following description.

DESCRIPTION OF THE PREFERRED EMBODIMENTS

Embodiments of the present invention will be described in detail hereinbelow with reference to the drawings.

First, the configuration of a magnetic disk apparatus and a thin film magnetic head mounted on the magnetic disk apparatus according to an embodiment of the present invention will be described below with reference to FIGS. 1 to 5.

Figure 1:
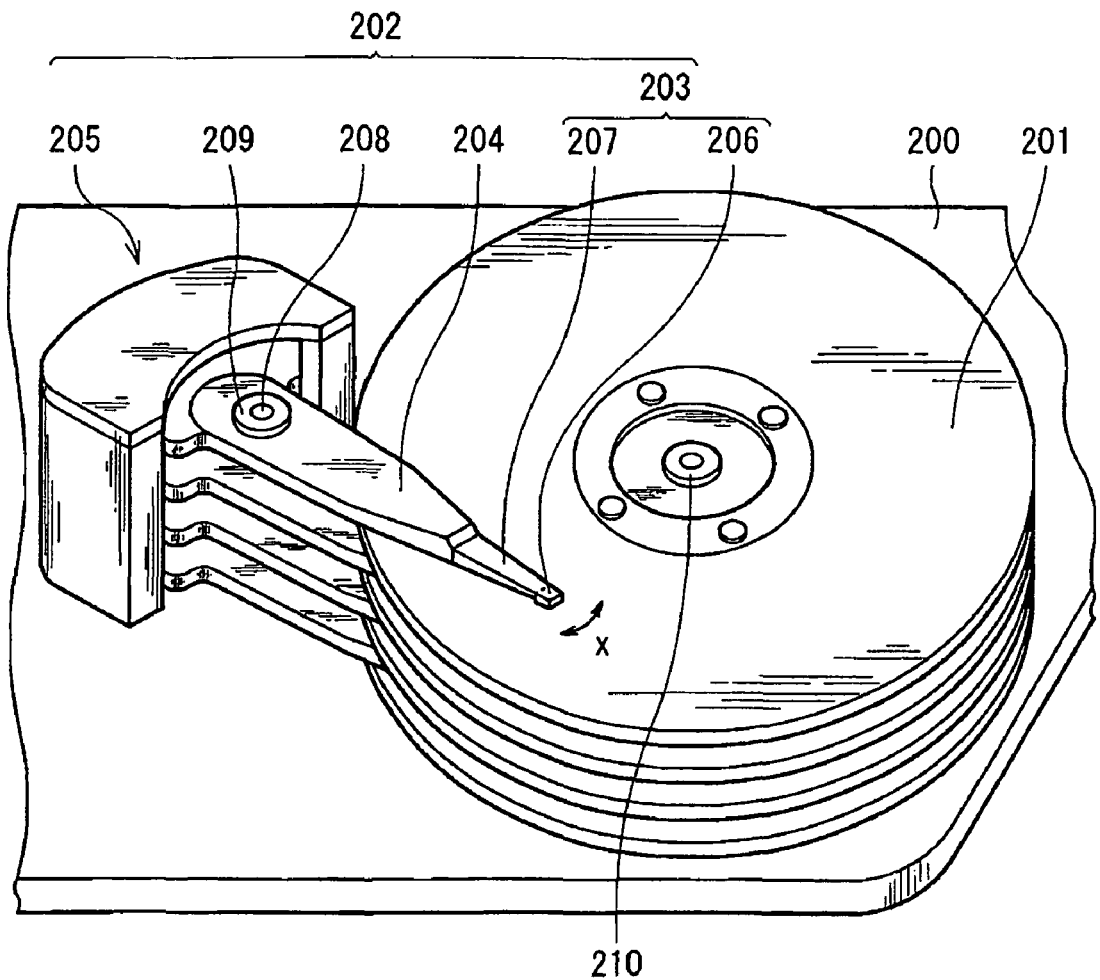
FIG. 1 is a perspective view showing a configuration of a magnetic disk apparatus on which a thin film magnetic head according to an embodiment of the present invention is mounted.

FIG. 1 is a perspective view showing an internal configuration of the magnetic disk apparatus of the embodiment. The magnetic disk apparatus is a so-called hard disk drive. As shown in FIG. 1, for example, in a casing 200, a magnetic recording medium (hard disk) 201 on which information is to be recorded, and a head arm assembly (HAA: Head Arm Assembly) 202 for recording/reproducing information to/from the magnetic recording medium 201 are provided. The HAA 202 has a head gimbals assembly (HGA: Head Gimbals Assembly) 203, an arm 204 for supporting the base portion of the HGA 203, and a drive unit 205 as a power source for making the arm 204 swing. The HGA 203 has a magnetic head slider (hereinbelow, simply called "slider") 206 provided with a thin film magnetic head 100 (which will be described later) according to the embodiment in its side face, and a suspension 207 having an end to which the slider 206 is attached. The other end of the suspension 207 (the end opposite to the slider 206) is supported by the arm 204. The arm 204 is structured to be possible to swing via a bearing 209 using a fixed shaft 208 fixed to the casing 200 as a center axis. The drive unit 205 is, for example, a voice coil motor or the like. Usually, the magnetic disk apparatus has a plurality of magnetic recording media 201 as shown in FIG. 1, and the slider 206 is disposed for each of the recording surfaces (the surface and the rear surface) of the magnetic recording media 201. The sliders 206 can move in the direction (X direction) crossing reproduction tracks in a plane parallel with the recording surfaces of the magnetic recording media 201. On the other hand, the magnetic recording media 201 rotate in the direction almost perpendicular to the X direction around a spindle motor 210 fixed to the casing 200 as a center.

Figure 2:
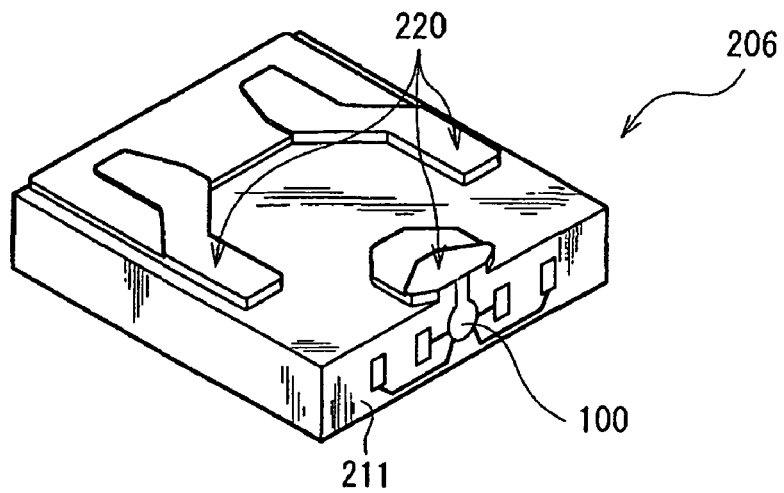
FIG. 2 is a perspective view showing a configuration of a main part of the magnetic device apparatus illustrated in FIG. 1.

In the magnetic head slider 202, for example, as shown in FIG. 2, the thin film magnetic head 100 is formed in one face of a base body 211 having an almost rectangular parallelepiped structure made of a nonmagnetic material such as altic. An air bearing surface 220 of the base body 211 has a structure with projections and depressions for decreasing air resistance which occurs when the arm 204 swings for example. A thin film magnetic head 212 is attached to another surface orthogonal to the air bearing surface 220 (the surface on the right front side in FIG. 19). The thin film magnetic head 212 has the configuration described in the above embodiments. When the magnetic recording medium 201 rotates at the time of recording or reproducing information, the magnetic head slider 202 floats from the recording surface of the magnetic recording medium 201 by using air current generated between the recording surface (the surface opposite to the magnetic head slider 206) of the magnetic recording medium 201 and the air bearing surface 220. In FIG. 2, the structure shown in FIG. 1 is turned upside down so that the structure on the air bearing surface 220 side of the magnetic header slider 206 is easily seen.

In the magnetic disk apparatus, when the arm 204 swings at the time of recording or reproducing information, the magnetic head slider 206 moves to a predetermined area (recording area) in the rotating magnetic recording medium 201. When current is passed to the thin film magnetic head 100 in a state where it faces the magnetic recording medium 201, the thin film magnetic head 212 performs recording or reproducing process on the magnetic recording medium 201 on the basis of the above-described operation principle.

Figure 3:
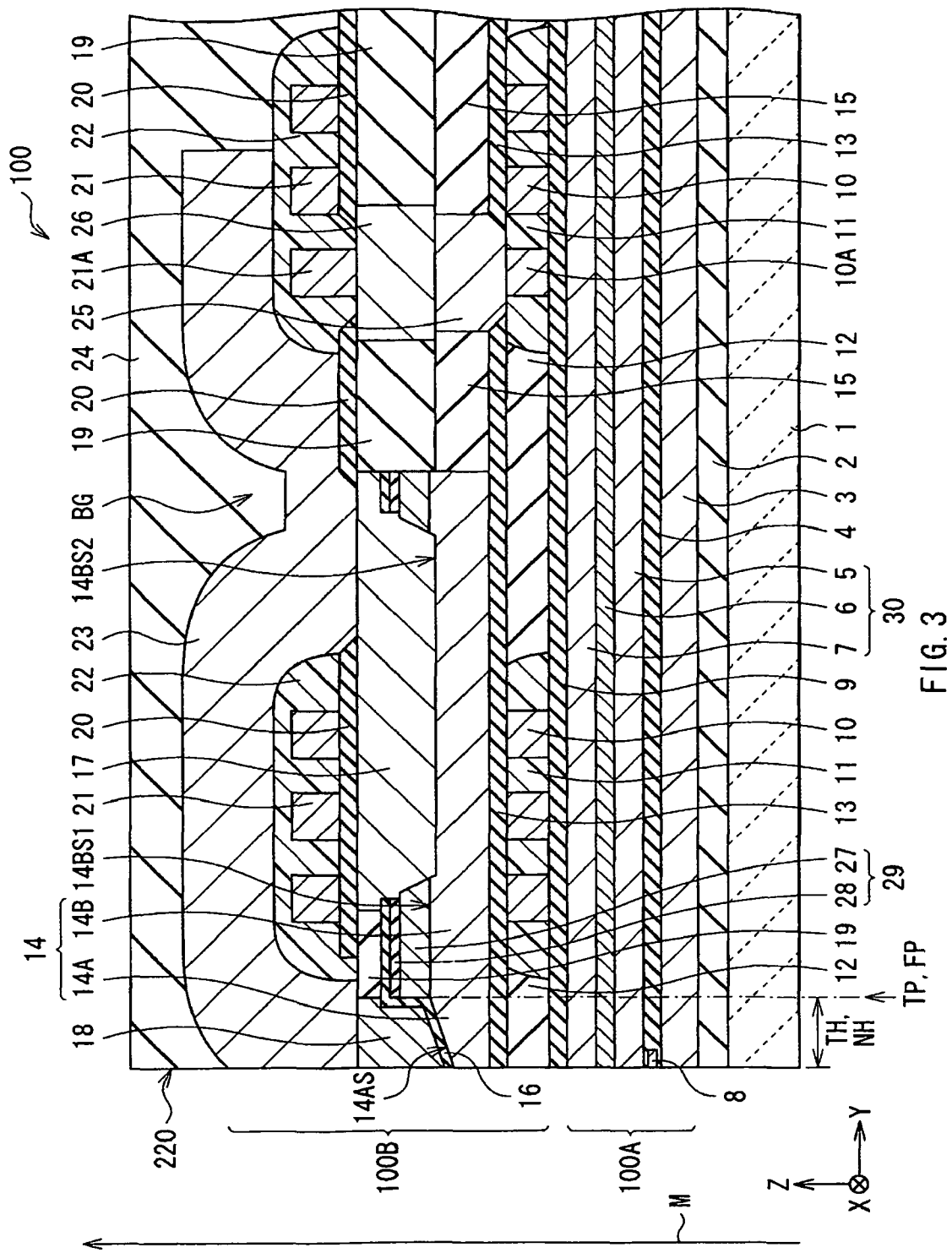
FIG. 3 is a cross section showing the configuration of the thin film magnetic head according to the embodiment of the invention.
Figure 4:
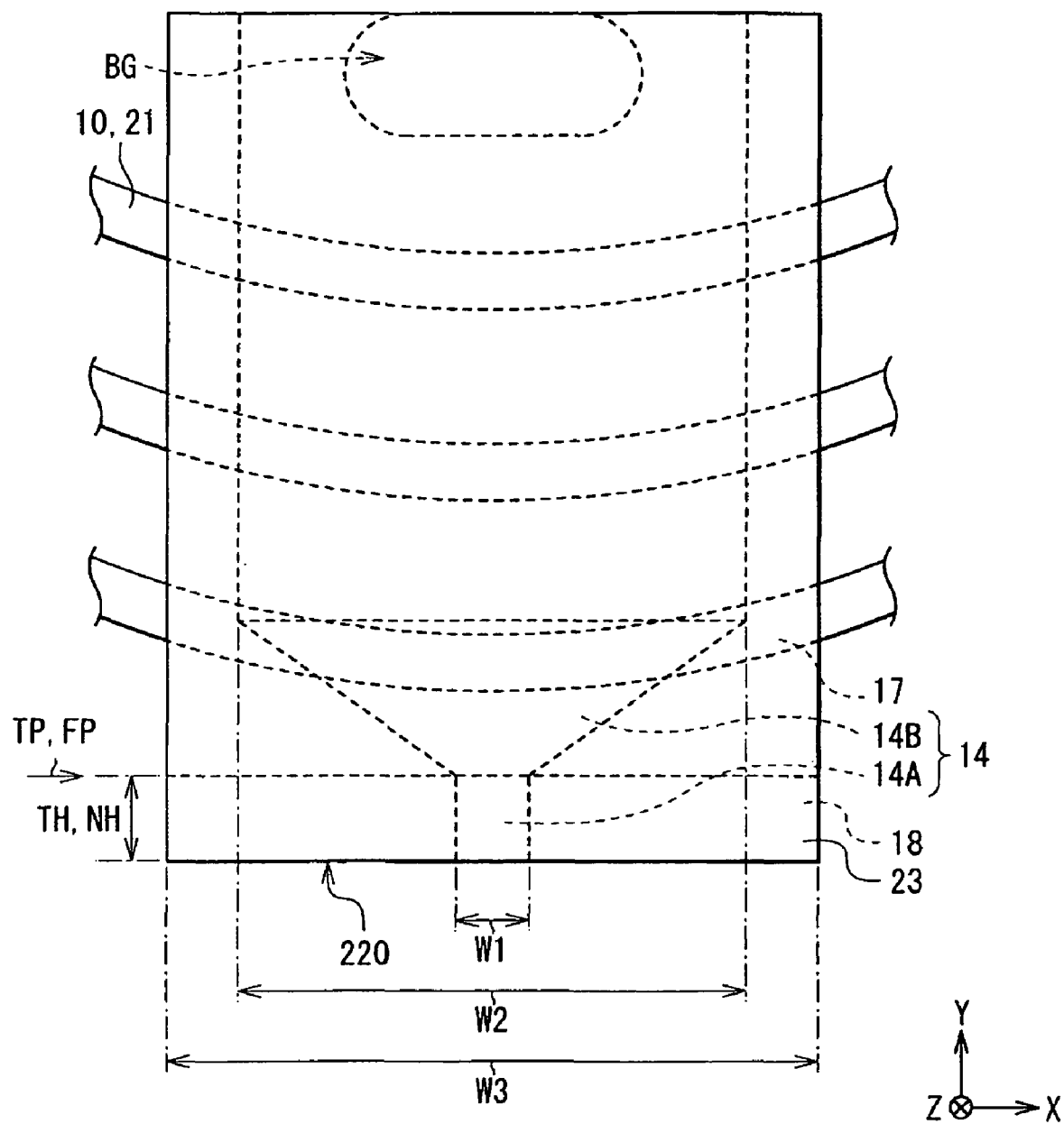
FIG. 4 is a plan view showing the configuration of the thin film magnetic head illustrated in FIG. 3.
Figure 5:
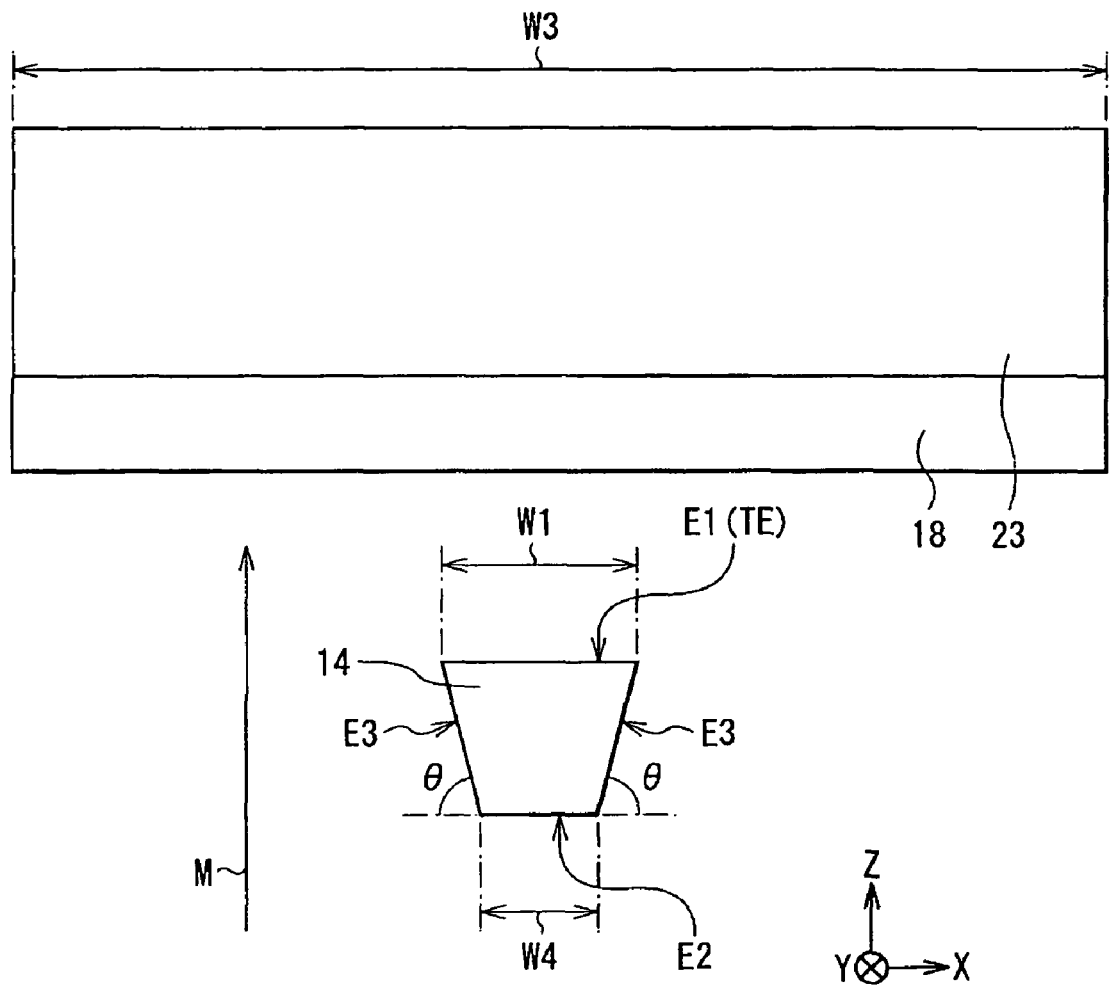
FIG. 5 is a plan view showing a partial configuration of an end face exposed from an air bearing surface of the thin film magnetic head illustrated in FIG. 3.

FIGS. 3 to 5 show the configuration of the thin film magnetic head 100. More specifically, FIG. 3 shows a sectional configuration perpendicular to the air bearing surface 220, and FIG. 4 shows a configuration in plan view. FIG. 5 shows a configuration of a main part seen from the side of the magnetic recording medium 201. The upward arrow M shown in FIGS. 3 and 5 expresses the direction of movement of the magnetic recording medium 201 relative to the thin film magnetic head 100 (medium travel direction M).

In the following description, the dimension in the X-axis direction shown in FIGS. 3 to 5 will be expressed as "width", the dimension in the Y-axis direction will be expressed as "length", and the dimension in the Z-axis direction will be expressed as "thickness". The side close to the air bearing surface 220 in the Y-axis direction will be expressed as "forward", and the opposite side will be expressed as "rearward". The expression will be also used in the description of FIG. 6 and subsequent figures.

The thin film magnetic head 100 performs a magnetic process on the magnetic recording medium 201 shown in FIG. 1. For example, the thin film magnetic head 100 is a composite head capable of executing both reproducing process and recording process as magnetic process. The thin film magnetic head 100 is obtained by, for example, as shown in FIG. 3, stacking an insulating layer 2, a reproduction head part 100A, an isolation layer 9, a write head part 100B, and an overcoat layer 24 in this order on a substrate 1. One end face of the thin film magnetic head 100 is an air bearing surface 220. The reproduction head part 100A executes the reproducing process by using the magneto-resistive effect (MR: Magneto-Resistive effect). The write head part 100B executes a recording process in the perpendicular recording method. The substrate 1 is made of, for example, a ceramic material such as altic ($Al_2O_3.TiC$). The insulating layer 2, the isolation layer 9, and the overcoat layer 24 are made of, for example, a nonmagnetic insulating material such as aluminum oxide ($AlO_x$: such as alumina ($Al_2O_3$)).

The reproduction head part 100A is obtained by stacking, for example, a bottom read shield layer 3, a shield gap film 4, and a top read shield layer 30 in order. A reproduction device (MR device 8) is buried in the shield gap film 4, and one end face of the reproduction device is exposed from the air bearing surface 220.

The bottom read shield layer 3 and the top read shield layer 30 extend rearward from the air bearing surface 220 and is made of, for example, a magnetic material such as nickel iron alloy (NiFe: hereinbelow, simply called "permalloy (trade name)". The composition of permalloy is that, for example, the content of nickel (Ni) is 80 weight %, and that of iron (Fe) is 20 weight %. The top read shield layer 30 is obtained by, for example, stacking two top read shield layer parts 5 and 7 sandwiching a nonmagnetic layer 6. The top read shield layer parts 5 and 7 are made of, for example, a magnetic material such as permalloy, and the nonmagnetic layer 6 is made of, for example, a nonmagnetic material such as ruthenium (Ru) or alumina. The top read shield layer 30 does not always have to have a stack structure but may have a single-layer structure made of a magnetic material.

The shield gap film 4 is made of, for example, a nonmagnetic insulating material such as alumna. The MR device 8 is, for example, a GMR device using the GMR effect (GMR: giant magneto-resistive effect). In the case of a GMR device of a CPP (Current perpendicular to Plane) type in which sense current flows in the stack direction, the under face and the top face of the MR device 8 are in contact with the bottom read shield layer 3 and the top read shield layer 30, respectively. In this case, the bottom read shield layer 3 and the top read shield layer 30 function also as electrodes for supplying the sense current to the MR device 8. The MR device 8 may also be a TMR device using a tunneling magneto-resistive effect (TMR: tunneling magneto-resistive effect). In this case as well, like the GMR device of the CPP type, the under face and the top face of the MR device 8 have to be disposed so as to be in contact with the bottom read shield layer 3 and the top read shield layer 30, respectively.

The write head part 100B is, for example, a perpendicular magnetic recording head and is so-called shield head in which a thin film coil 10 in a first stage, an insulating layer 13, a main magnetic pole layer 14 in which surrounding thereof is buried by a nonmagnetic layer 15, a gap layer 16, an auxiliary magnetic pole layer 17 and a write shield layer 18 in which surroundings thereof are buried by a nonmagnetic layer 19, an insulating layer 20, a thin film coil 21 in a second stage, and a return yoke layer 23 are stacked in this order over the isolation layer 9. A connection part 25 penetrating the insulating layer 13 and the nonmagnetic layer 15 in the thickness direction is provided in a rear part in the main magnetic pole layer 14. A connection part 26 penetrating the nonmagnetic layer 19 in the thickness direction is provided in a rear part in the auxiliary magnetic pole layer 17. A stack structure 29 in which two nonmagnetic layers 27 and 28 are stacked is provided between the auxiliary magnetic pole layer 17 and the write shield layer 18. One end face of each of the main magnetic pole layer 14, the gap layer 16, the write shield layer 18, and the return yoke layer 23 is exposed from the air bearing surface 220. Some openings are formed in the insulating layer 20, and the return yoke layer 23 is magnetically coupled to the write shield layer 18 in the most front position. The return yoke layer 23 is also magnetically coupled to the auxiliary magnetic pole layer 17 in a winding center portion of the thin film coil 21. Further, an end 21A on the winding center side in the thin film coil 21 is electrically connected to the connection part 26 on the rear side of a back gap BG.

The thin film coil 10 generates a magnetic flux for suppressing leakage in order to suppress leakage of a magnetic flux for recording generated by the thin film coil 21 (unintentional spread of the magnetic flux for recording to the reproduction head part 100A). The thin film coil 10 is made of a high-conductive material such as copper (Cu) and has a spiral structure that the thin film coil 10 winds around the back gap BG as a center in the layer stack plane (in the XY plane) as shown in FIGS. 3 and 2. Although the number of windings (the number of turns) of the thin film coil 10 can be arbitrarily set, preferably, it matches the number of turns of the thin film coil 21. The spaces between the turns and the periphery of the thin film coil 10 are buried by insulating layers 11 and 12, and the thin film coil 10 is isolated from the main magnetic pole layer 14 by the insulating layer 13. An end part 10A on the winding center side in the thin film coil 10 is electrically connected to an end 21A on the winding center side of the thin film coil 21 via the connection parts 25 and 26.

Specifically, the insulating layer 11 is provided between the turns of the thin film coil 10 and is made of, for example, a nonmagnetic insulating material such as photoresist or spin on glass (SOG: spin on glass) expressing fluidity when heated. The insulating layer 12 is disposed around the insulating layer 11, and the insulating layer 13 is disposed so as to cover the thin film coil 10 and the insulating layers 11 and 12. The insulating layers 12 and 13 are made of, for example, a nonmagnetic insulating material such as alumina. The thickness of the insulating layer 13 is about 0.05 μm to 0.2 μm.

The main magnetic pole layer 14 leads the magnetic flux generated by the thin film coil 21 to the magnetic recording medium 201 and extends rearward from the air bearing surface 220. The main magnetic pole layer 14 is made of, for example, a metal magnetic material containing at least one of iron (Fe), nickel (Ni), and cobalt (Co). In particular, preferably, it is made of an iron-cobalt-based alloy. Examples of the iron-cobalt-based alloy are such as an iron cobalt alloy (FeCo) and a cobalt iron nickel alloy (CoFeNi).

The main magnetic pole layer 14 has, for example, a battledore-like shape in plan view as a whole as shown in FIG. 4 and includes, in order from the air bearing surface 220, a front end part 14A having a predetermined width W1 specifying the recording track width and a rear end part 14B magnetically coupled to the rear side of the front end part 14A and having a width W2 larger than the width W1. One end face of the front end part 14A is exposed from the air bearing surface 220. The front end part 14 is an inclined part in which an inclined surface 14AS is formed and whose thickness gradually increases with distance from the air bearing surface 220 (refer to FIG. 3). That is, the cross section area of the front end part 14A decreases toward the air bearing surface 220 from a flare point FP. The width of the rear end part 14B is, for example, constant (W2) in the rear part and gradually decreases toward the front end part 14A in a front part. The position where the width of the main magnetic pole layer 14 starts to increase from W1 to W2 is the flare point FP. The distance between the air bearing surface 220 and the flare point FP corresponds to neck height NH. The rear end part 14B is a flat part generally having an almost constant thickness throughout thereof. However, the area where the stack structure 29 in the rear end part 14B is slightly thicker than the other area. The thickness difference is about 40 nm at the maximum. To be specific, in the thickness direction, the difference between position of a surface 14BS1 of the area where the stack structure 29 is provided and the position of a surface 14BS2 which is in contact with the auxiliary magnetic pole layer 17 is suppressed to about 40 nm or less. The thickness of the area in which the stack structure 29 is provided is about 0.15 μm to 0.4 μm. The thickness on the air bearing surface 220 side in the front end part 14A is smaller than that on the rear end part 14B side by, for example, about 100 nm.

The end face of the main magnetic pole layer 14 in the air bearing surface 220 has, for example, as shown in FIG. 5, an inverted trapezoid shape using the long side positioned on the trailing side as the upper base and using the short side positioned on the leading side as a lower base. More concretely, the end face of the main magnetic pole layer 14 has a shape defined by an upper edge E1 (width W1) positioned on the trailing side, a lower edge E2 (width W4) positioned on the leading side, and two side edges E3. The width W4 is smaller than the width W1. The upper edge E1 is a substantial recording part (so-called trailing edge TE) of the main magnetic pole layer 14 and its width W1 is about 0.2 μm or less. A bevel angle θ, that is, the angle between the extension direction of the lower edge E2 and the side edge E3 can be set to any angle less than 90°. When the travel state of the magnetic recording medium 201 moving in the medium travel direction M is seen as a flow, the "trailing side" means the outflow side (the front side in the medium travel direction M) and, in this case, is the upper side in the thickness direction (Z-axis direction). On the other hand, the inflow side (the rear side in the medium travel direction M) is called the "leading side" and, in this case, is the lower side in the thickness direction.

The nonmagnetic layer 15 is made of, for example, a nonmagnetic insulating material such as alumina.

The stack structure 29 is a structure in which the nonmagnetic layers 27 and 28 are stacked in order from the side of the rear end part 14B, and is disposed in a position (the most front position) closest to the air bearing surface 220 on the rear end part 14B. The nonmagnetic layers 27 and 28 are made of materials different from each other. Preferably, the nonmagnetic layer 28 is made of a material whose etching rate in wet etching process and reactive ion etching (RIE) process is higher than that of the nonmagnetic layer 27 by 10 times or more. Preferably, the nonmagnetic layer 27 is made of a material whose etching rate in milling process such as ion milling is lower than that of the main magnetic pole layer 14. Concretely, it is preferable that the nonmagnetic layer 27 be made of, for example, a nonmagnetic metal containing at least one of ruthenium (Ru) and chromium (Cr), and the nonmagnetic layer 28 be made of a nonmagnetic insulating material containing aluminum oxide ($Al_2O_x$). The thickness of the nonmagnetic layer 27 is, for example, 0.2 μm, and the thickness of the nonmagnetic layer 28 is, for example, 0.3 μm. An adhesion layer made of titanium (Ti), chromium (Cr), tungsten (W), tantalum (Ta), or the like may be provided between the nonmagnetic layers 27 and 28 and/or between the nonmagnetic layer 27 and the main magnetic pole layer 14.

The gap layer 16 continuously extends from the air bearing surface 220 to the front end face of the auxiliary magnetic pole layer 17 so as to cover the top face of the inclined surface 14AS of the front end part 14A of the main magnetic pole layer 14 and the stack structure 29. The gap layer 16 is made of, for example, a nonmagnetic insulating material such as alumina. In the gap layer 16, a portion sandwiched between the main magnetic pole layer 14 and the write shield layer 18 is a magnetic gap (write gap) for magnetically isolating the main magnetic pole layer 14 and the write shield layer 18, and the thickness of the portion is about 0.03 μm to 0.1 μm. The portion covering the stack structure 29 in the gap layer 16 is covered with the nonmagnetic layer 19.

The auxiliary magnetic pole layer 17 is provided to supply the magnetic flux to the main magnetic pole layer 14, and extends rearward from a position backward from the air bearing surface 220. The auxiliary magnetic pole layer 17 is made of, for example, a magnetic material such as permalloy or iron-cobalt-based alloy, and has a rectangular shape having width W2 in plan view as shown by a broken line in FIG. 4. The auxiliary magnetic pole layer 17 is thicker than the main magnetic pole layer 14 to increase the magnetic flux intake capacity (so-called magnetic volume) and has a thickness of about 0.5 μm to 1 μm. The auxiliary magnetic pole layer 17 is positioned rearward of the stack structure 29 in the Y-axis direction, and is disposed on the trailing side of the main magnetic pole layer 14 in the Z-axis direction and magnetically coupled to the main magnetic pole layer 14. The structure in which the auxiliary magnetic pole layer 17 is positioned on the trailing side of the main magnetic pole layer 14 is called a top yoke structure.

The write shield layer 18 captures a spread component in the magnetic flux guided from the main magnetic pole layer 14 to the magnetic recording medium 201, thereby (1) increasing the magnetic field gradient of the perpendicular magnetic field, (2) narrowing the recording width, and (3) making an oblique magnetic field component included in the perpendicular magnetic field. The write shield layer 18 is disposed in a region on the front side of the stack structure 29 at the same level as the auxiliary magnetic pole layer 17, that is, a region corresponding to the front end part 14A on the gap layer 16. The write shield layer 18 is made of, for example, a magnetic material such as permalloy or an iron-cobalt-based alloy and has a rectangular shape in plan view having the width W3 larger than the width W2 of the auxiliary magnetic pole layer 17. The nonmagnetic layer 19 specifying a throat height zero position TP is adjacent to a rear end 1 8T of the write shield layer 18. That is, the write shield layer 18 plays the role of substantially specifying the throat height zero position TP in the rear end.

The nonmagnetic layer 19 specifies the throat height zero position TP at the front end, and the distance between the air bearing surface 220 and the throat height zero position TP corresponds to throat height TH. FIGS. 3 and 4 show, for example, the case where the throat height zero position TP coincides the flare point FP. The nonmagnetic layer 19 is disposed in a region on the front side of the auxiliary magnetic layer 17 at the same level and, for example, is filled between the auxiliary magnetic pole layer 17 and the write shield layer 18. The nonmagnetic layer 19 is disposed in the region on the front side of the auxiliary magnetic pole layer 17 at the same level, and is also disposed to bury the surrounding of the auxiliary magnetic pole layer 17. The nonmagnetic layer 19 is made of, for example, a nonmagnetic insulating material such as aluminum oxide (for example, alumina) or aluminum nitride or a nonmagnetic conductive material such as ruthenium.

The thin film coil 21 generates a magnetic flux for recording. In the thin film coil 21, for example, current flows in the direction opposite to the current flow direction in the thin film coil 10. The thin film coil 21 winds on the insulating layer 20. The space between the turns and the periphery of the thin film coil 21 are buried with the insulating layer 22 so that the thin film coil 21 is isolated from the return yoke layer 23 and is also isolated from the auxiliary magnetic pole layer 17 by the insulating layer 20. The other configuration of the thin film coil 21 is similar to that of the thin film coil 10.

The insulating layer 20 is the base of the thin film coil 21 and is made of, for example, a nonmagnetic insulating material similar to that of the insulting layer 12. The insulating layer 22 is made of, for example, a nonmagnetic insulting material similar to that of the insulting layer 11 and covers the thin film coil 21 and the insulating layer 20. Those are disposed so as not to close the back gap BG and are coupled to the nonmagnetic layer 19. The front end of the insulating layer 22 is receded from, for example, the most front end of the nonmagnetic layer 19.

The return yoke layer 23 collects the magnetic flux after recording (the magnetic flux used for the recording process in the magnetic recording medium 201), and resupplies it to the main magnetic pole layer 14 and the auxiliary magnetic pole layer 17, thereby making the magnetic flux circulate between the thin film magnetic head and the magnetic recording medium 201. The return yoke layer 23 extends rearward from the air bearing surface 220. The return yoke layer 23 is made of, for example, a magnetic material similar to that of the write shield layer 18 and has a rectangular shape in plan view having the width W3 as shown in FIG. 4. The end face exposed from the air bearing surface 220 of each of the write shield layer 18 and the return yoke layer 23 has, for example, a rectangular shape as shown in FIG. 5.

The magnetic recording medium 201 includes, for example, from the side close to the thin film magnetic head 100, a magnetization layer and a soft magnetic layer (which are not shown). In the magnetization layer, information is magnetically recorded. The soft magnetic layer functions as a magnetic flux path (so-called flux path) in the magnetic recording medium 201. The medium structure is generally called a double-layer recording medium for perpendicular recording. Obviously, the magnetic recording medium 201 may include other layer together with the magnetization layer and the soft magnetic layer.

The thin film magnetic head 100 operates as follows. First, at the time of recording information, when current is passed from a not-shown external circuit to the thin film coil 21 of the recording head part 100B, the magnetic flux J for recording is generated. The magnetic flux J is taken in the main magnetic pole layer 14 and the auxiliary magnetic pole layer 17 and, after that, passes through the main magnetic pole layer 14 toward the front end part 14A. The magnetic flux J is narrowed at the flare point FP and focused. The magnetic flux J is further focused as the sectional area gradually decreases from the flare point FP toward the air bearing surface 220. Consequently, the magnetic flux J is finally concentrated near the trailing edge TE. When the magnetic flux J is released to the outside and the perpendicular magnetic field is generated, the magnetization layer is magnetized by the perpendicular magnetic field, and information is magnetically recorded on the magnetic recording medium 201. Since current in the opposite directions flows in the thin film coils 10 and 21, magnetic fluxes in opposite directions are generated from the thin film coils 10 and 21. Concretely, the magnetic flux for suppressing leakage is generated upward in the thin film coil 10 and, on the other hand, the magnetic flux for recording is generated downward in the thin film coil 21. Consequently, by the influence of the magnetic flux for suppressing leakage, the flow of the magnetic flux for recording from the write head part 100B to the reproduction head part 100A is suppressed, and leakage of the magnetic flux for recording is suppressed. As a result, by the influence of the magnetic flux for recording, deterioration in detection precision of the MR device 8 is suppressed. Moreover, the magnetic flux for recording is taken in the bottom read shield layer 3 and the top read shield layer 30 so that generation of unnecessary magnetic fields is suppressed. Therefore, unintentional erasure of information recorded on the magnetic recording medium 201 is prevented.

When the magnetic flux J is released from the front end part 14A, the spread component in the magnetic flux J is taken in the write shield layer 18, so that spread of the perpendicular magnetic field is suppressed. The magnetic flux J taken in the write shield layer 18 is re-supplied via the return yoke layer 23 to the main magnetic pole layer 14 and the auxiliary magnetic pole layer 17. The magnetic flux J released from the main magnetic pole layer 14 toward the magnetic recording medium 201 magnetizes the magnetization layer and, after that, is collected by the return yoke layer 23 via the soft magnetic layer. At this time, a part of the magnetic flux J is also collected by the write shield layer 18. The taken magnetic fluxes J are resupplied to the main magnetic pole layer 14 and the auxiliary magnetic pole layer 17. As a result, the magnetic flux J is circulated between the write head part 100B and the magnetic recording medium 201, so that a magnetic circuit is constructed.

On the other hand, at the time of reproducing information, when sense current is passed to the MR device 8 in the reproduction head part 100A, the resistance of the MR device 8 changes according to the signal magnetic field for reproduction from the magnetic recording medium 201. By detecting the resistance change as a voltage change, the information recorded on the magnetic recording medium 201 is reproduced.

As described above, in the thin film magnetic head 100, the main magnetic pole layer 14 includes the front end part 14A which becomes thicker from the air bearing surface 220 side and the rear end part 14B. The stack structure 29 disposed in the most front position on the rear end part 14B includes the nonmagnetic layers 27 and 28 made of different kinds of materials. Consequently, the boundary position (flare point FP) between the inclined surface 14AS of the front end part 14A and the face 14BS of the rear end part 14B is positioned with high precision. That is, at the time of processing the inclined surface of the front end part 14A in the manufacturing process to be described below, by using the nonmagnetic layer 28 as a mask and etching the main magnetic pole layer 14 together with the nonmagnetic layer 27, the nonmagnetic layer 27 functions as a sacrifice layer. Therefore, a step between the inclined surface 14AS of the front end part 14A and the surface 14BS of the rear end part 14B is difficult to appear. In addition, since the nonmagnetic layer 27 functions as a sacrifice layer, the position in the depth direction of the surface to be etched and the inclination angle can be easily controlled. Therefore, the inclined surface 14AS in the front end part 14A of the main magnetic pole layer 14 has a desired inclination angle in a desired position. As a result, a leak magnetic flux can be reduced in the recording operation, and the recording magnetic field having higher magnetic flux density can be emitted.

Next, a method of manufacturing the thin film magnetic head 100 will be described with reference to FIGS. 3 to 5 and, in addition, FIGS. 6 to 14. FIGS. 6 to 14 are provided to explain the process of manufacturing the thin film magnetic head 100 and show sectional configurations corresponding to FIG. 3. In the following, outline of the method of manufacturing the thin film magnetic head 100 as a whole will be described. After that, the process for forming the main part of the write head part 100B will be described in detail. Since the configuration of a series of components of the thin film magnetic head 100 has already been described in detail, the description will be omitted as needed.

The thin film magnetic head 100 is manufactured by sequentially forming and stacking the series of components using existing thin film processes including, mainly, the film forming technique typified by plating or sputtering, the patterning technique typified by photolithography, the etching technique typified by dry etching or wet etching, and the planarization technique typified by polishing. Specifically, as shown in FIG. 3, first, the insulating layer 2 is formed on the substrate 1. After that, the bottom read shield layer 3, the shield gap film 4 in which the MR device 8 is buried, and the top read shield layer 30 (the top read shield layer parts 5 and 7 and the nonmagnetic layer 6) are formed and stacked in this order on the insulating layer 2, thereby forming the reproduction head part 100A. Subsequently, the isolation layer 9 is formed on the reproduction head part 100A. After that, on the isolation layer 9, the thin film coil 10 buried in the insulating layers 11 to 13, the main magnetic pole layer 14 in which the surrounding thereof is buried by the nonmagnetic layer 15, the gap layer 16, the auxiliary magnetic pole layer 17 and the write shield layer 18 in which surroundings thereof are buried by the nonmagnetic layer 19, the thin film coil 21 buried in the insulating layers 20 and 22, and the return yoke layer 23 are formed and stacked in this order, thereby forming the write head part 100B. Finally, the overcoat layer 24 is formed on the write head part 100B and the air bearing surface 220 is formed by using mechanical process and polishing process, thereby completing the thin film magnetic head 100.

At the time of forming the main part of the recording head part 100B, first, the insulating layer 13 is formed on the entire surface so as to cover the thin film coil 10 and the insulating layers 11 and 12 and the like, an opening is formed in a part of the insulating layer 13 by ion milling or the like so that the end part 10A of the thin film coil 10 is exposed. Next, the main magnetic pole layer 14 is formed in a predetermined position on the insulting layer 13 by, for example, frame plating and the connection part 25 is formed in a position corresponding to the end part 10A of the thin film coil 10.

The procedure of forming the main magnetic pole layer 14 using the frame plating is as follows. First, for example, by using sputtering, a seed layer (not shown) as an electrode film is formed on the insulating layer 13. Subsequently, a photoresist is applied on the surface of the insulating layer 13 to form a photoresist film. After that, by patterning (exposing and developing) the photoresist film by using the photolithography, a photoresist pattern as a frame for plating is formed. Subsequently, by making a plating film selectively grown on the seed layer by using the photoresist pattern, a magnetic layer 14Z which will become the main magnetic pole layer 14 finally and the connection part 25 are formed. After that, the photoresist pattern is removed and the unnecessary seed layer is selectively removed by ion milling or the like. Further, the nonmagnetic layer 15 is formed around the magnetic layer 14Z and the connection part 25. The details of the forming process will be described later using the process of forming the nonmagnetic layer 19.

Figure 6:
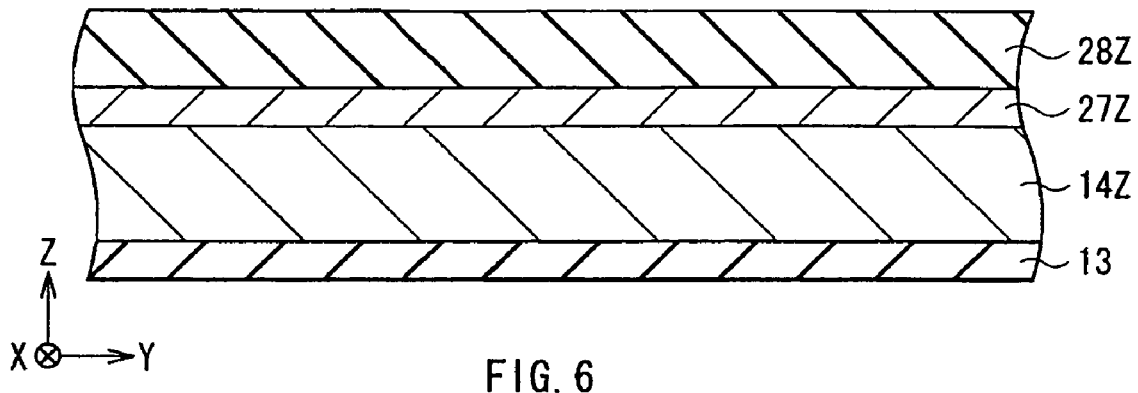
FIG. 6 is a cross section for explaining a step in a manufacturing process of the thin film magnetic head according to the embodiment of the invention.
Figure 7:
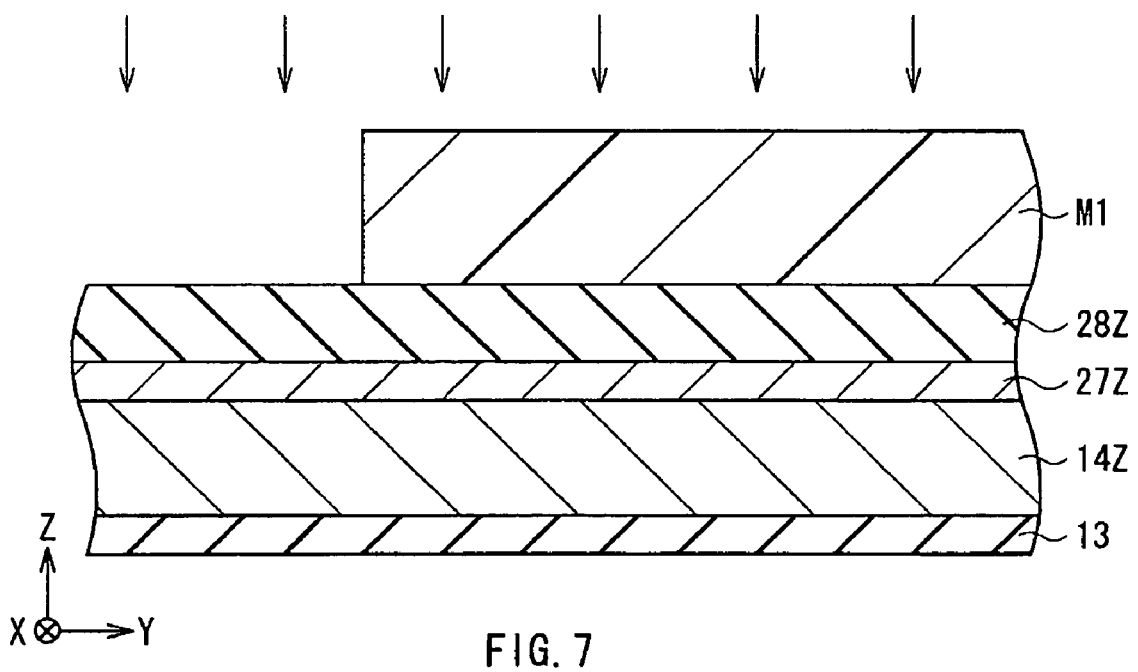
FIG. 7 is a cross section for explaining a step subsequent to FIG. 6.
Figure 8:
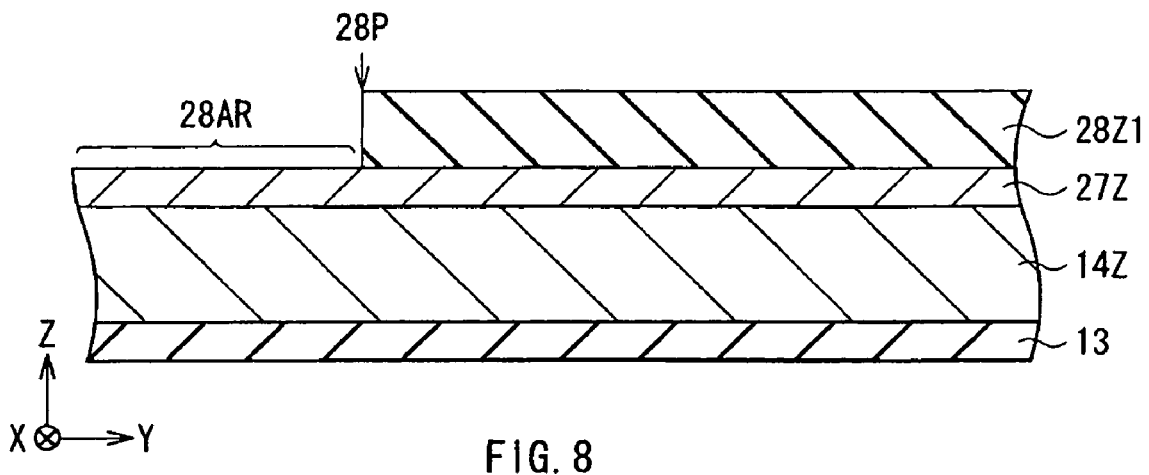
FIG. 8 is a cross section for explaining a step subsequent to FIG. 7.

Then, as shown in FIG. 6, nonmagnetic layers 27Z and 28Z are formed in order on the magnetic layer 14Z. Further, as shown in FIG. 7, a mask pattern M1 which is, for example, a photoresist pattern is formed on the nonmagnetic layer 28Z, and the region which is not covered with the mask pattern M1 in the nonmagnetic layer 28Z is removed by etching process such as reactive ion etching. As a result, as shown in FIG. 8, a patterned nonmagnetic layer 28Z1 is obtained while leaving the nonmagnetic layer 27Z.

Figure 9:
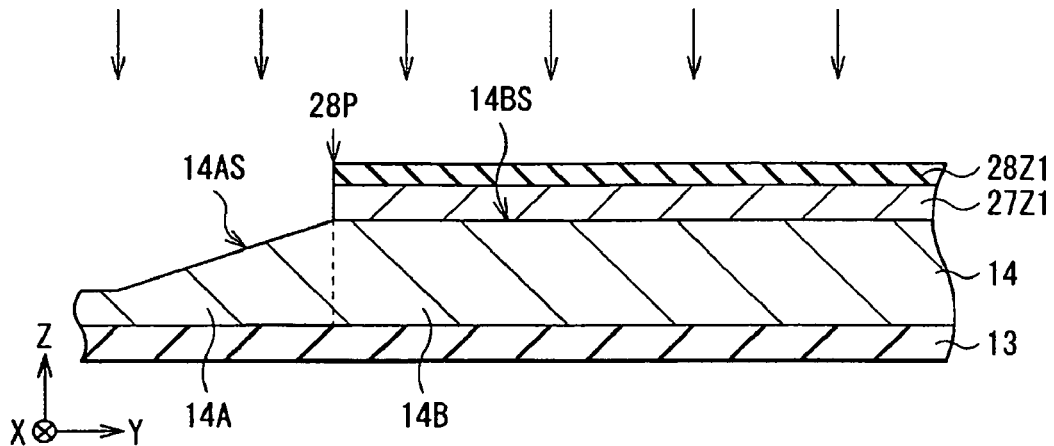
FIG. 9 is a cross section for explaining a step subsequent to FIG. 8.

After removing the mask pattern M1 (FIG. 8), the milling process such as ion milling is selectively performed on the nonmagnetic layer 27Z and the magnetic layer 14Z using the nonmagnetic layer 28Z1 as a mask (FIG. 9). By removing all of the nonmagnetic layer 27Z in an exposed area 28AR which is not covered with the nonmagnetic layer 28Z1 and digging down the magnetic layer 14Z in the exposed area 28AR, the inclined surface 14AS is formed. In such a manner, the main magnetic pole layer 14 having the front end part 14A (inclined part) which becomes thinner with distance from an edge position 28P of the nonmagnetic layer 28Z1 is obtained. Simultaneously, a nonmagnetic layer 27Z1 having an end face matching the edge position 28P of the nonmagnetic layer 28Z1 is obtained. At this time, the nonmagnetic layer 28Z1 is also partially removed in the thickness direction and its thickness decreases. However, it is difficult to control the thickness of the nonmagnetic layer 28Z1.

Figure 10:
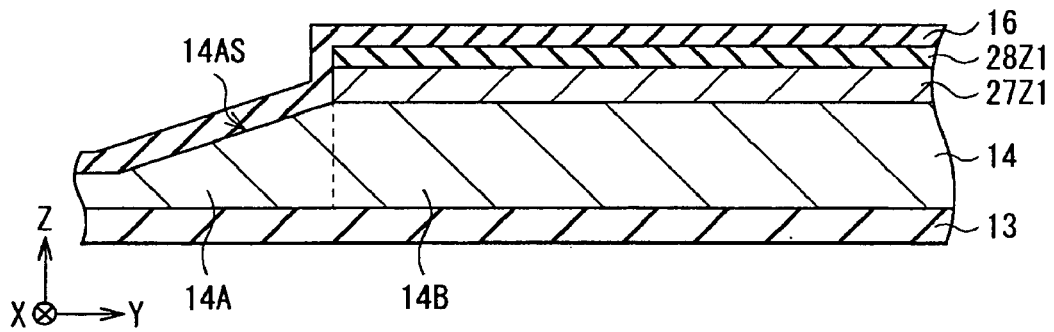
FIG. 10 is a cross section for explaining a step subsequent to FIG. 9.
Figure 11:
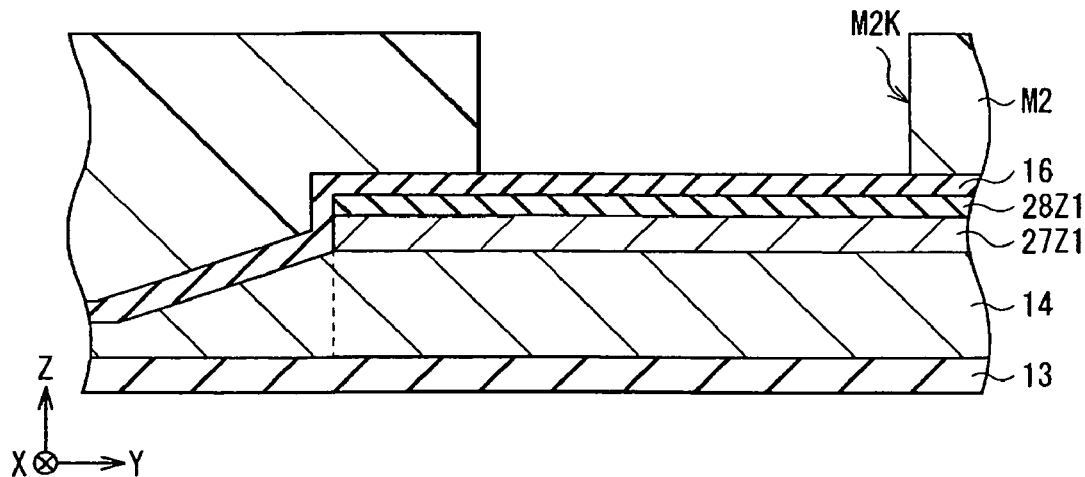
FIG. 11 is a cross section for explaining a step subsequent to FIG. 10.
Figure 12:
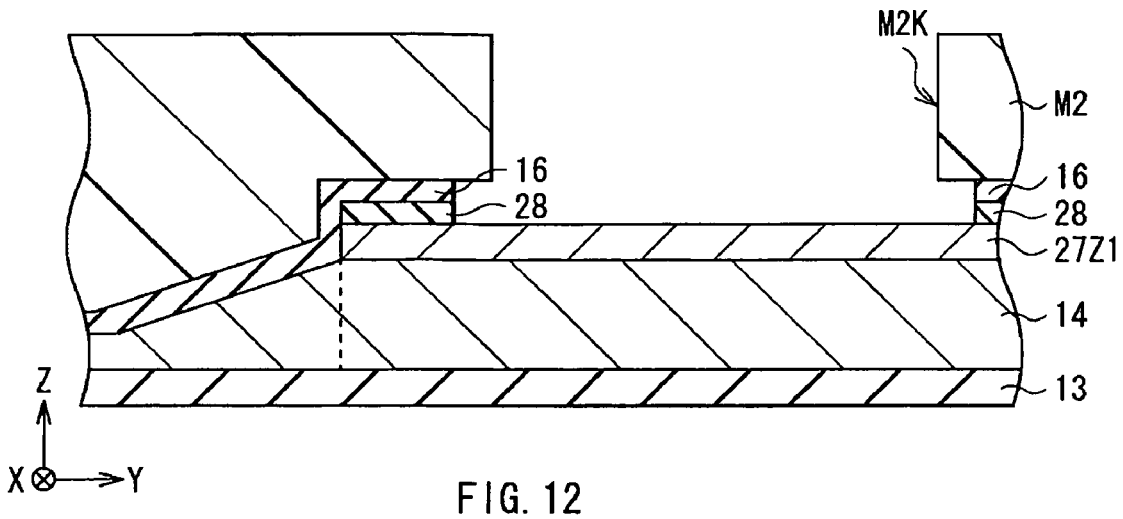
FIG. 12 is a cross section for explaining a step subsequent to FIG. 11.
Figure 13:
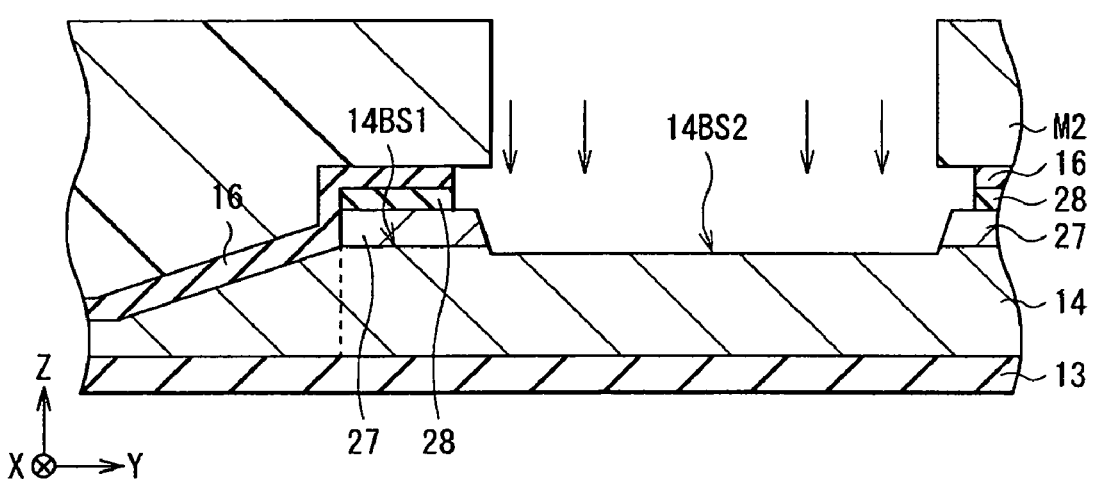
FIG. 13 is a cross section for explaining a step subsequent to FIG. 12.
Figure 14:
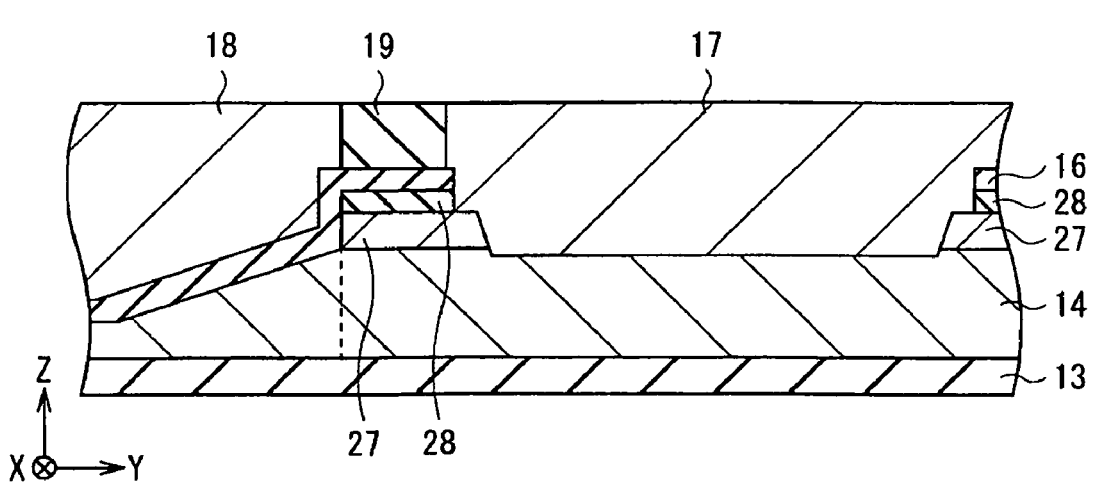
FIG. 14 is a cross section for explaining a step subsequent to FIG. 13.

Subsequently, as shown in FIG. 10, the gap layer 16 is formed on the main magnetic pole layer 14 and the nonmagnetic layer 28Z1 by, for example, sputtering. After forming the gap layer 16, as shown in FIG. 11, a mask pattern M2 having an opening M2K in a part of an area corresponding to the nonmagnetic layer 28Z1 and covering the other area is formed. By wet etching or reactive ion etching as a second etching process using the mask pattern M2, the gap layer 16 and the nonmagnetic layer 28Z1 in the exposed area corresponding to the opening M2K are removed (FIG. 12). In such a manner, the nonmagnetic layer 28 is obtained. At this time, the nonmagnetic layer 27Z1 functions as a stopper for the wet etching or reactive ion etching. Further, the nonmagnetic layer 27Z1 is selectively removed by milling process (for example, ion milling) using the mask pattern M2 to expose a partial area in the main magnetic pole layer 14 (FIG. 13). As a result, the nonmagnetic layer 27 is obtained. At this time, the face 14BS1 covered with the nonmagnetic layer 27, in the flat part 14B and the face 14BS2 exposed by the milling process have a gap (step) in the thickness direction. The size of the gap is about 40 nm at the maximum. Subsequently, the mask pattern M2 is removed. After that, as shown in FIG. 14, the auxiliary magnetic pole layer 17 and the write shield layer 18 are formed by, for example, frame plating. The auxiliary magnetic pole layer 17 is formed on the exposed face 14BS2 of the main magnetic pole layer 14, and the write shield layer 18 is formed so as to cover the area corresponding to the front end part 14A of the main magnetic pole layer 14, in the gap layer 16. In addition to the formation, the connection part 26 is formed on the connection part 25 by frame plating or the like (FIG. 3). In this case, the auxiliary magnetic pole layer 17, the write shield layer 18, and the connection part 26 may be formed in the same process or different processes.

Subsequently, as shown in FIG. 3, the nonmagnetic layer 19 is formed so as to bury the surroundings of the auxiliary magnetic layer 17, the write shield layer 18, and the connection layer 26. In this case, the nonmagnetic layer 19 is formed by sputtering so as to sufficiently cover the gap layer 16, the auxiliary magnetic pole layer 17, the write shield layer 18, and the connection part 26. After that, the nonmagnetic layer 19 is removed until at least the auxiliary magnetic pole layer 17, the write shield layer 18, and the connection part 26 are exposed, and the entire surface is planarized. As a method of planarization, polishing such as CMP (Chemical Mechanical Polishing), ion milling or etching such as reactive ion etching may be used. Among the methods, to increase flatness by a simple process, it is preferable to use polishing. The planarization process may be finished when the auxiliary magnetic pole layer 17, the write shield layer 18, and the connection part 26 are exposed. Alternately, by continuing the planarization process also after the auxiliary magnetic pole layer 17, the write shield layer 18, and the connection part 26 are exposed, the thickness of the auxiliary magnetic pole layer 17 and the write shield layer 18 may be adjusted to desired thickness.

Subsequently, the insulating layer 20 is selectively formed on the flat surface after the planarization by, for example, sputtering and, after that, the thin film coil 21 is formed on the insulating layer 20 by, for example, frame plating. In this case, the insulating layer 20 is positioned so as to cover an area where the thin film coil 21 is to be formed in a post process. In addition, the end 21A on the winding center side is connected to the connection part 26. Subsequently, the insulating layer 22 is formed so as to cover the insulating layer 20, the thin film coil 21 and the peripheral area thereof. In this case, for example, a photoresist is applied and heated to be flowed so that its most front end recedes from the most front end of the nonmagnetic layer 19.

Finally, the return yoke layer 23 is formed on the auxiliary magnetic pole layer 17, the write shield layer 18, and the insulating layer 22 by, for example, frame plating. In such a manner, the main part of the write head part 100B is completed.

Figure 15:
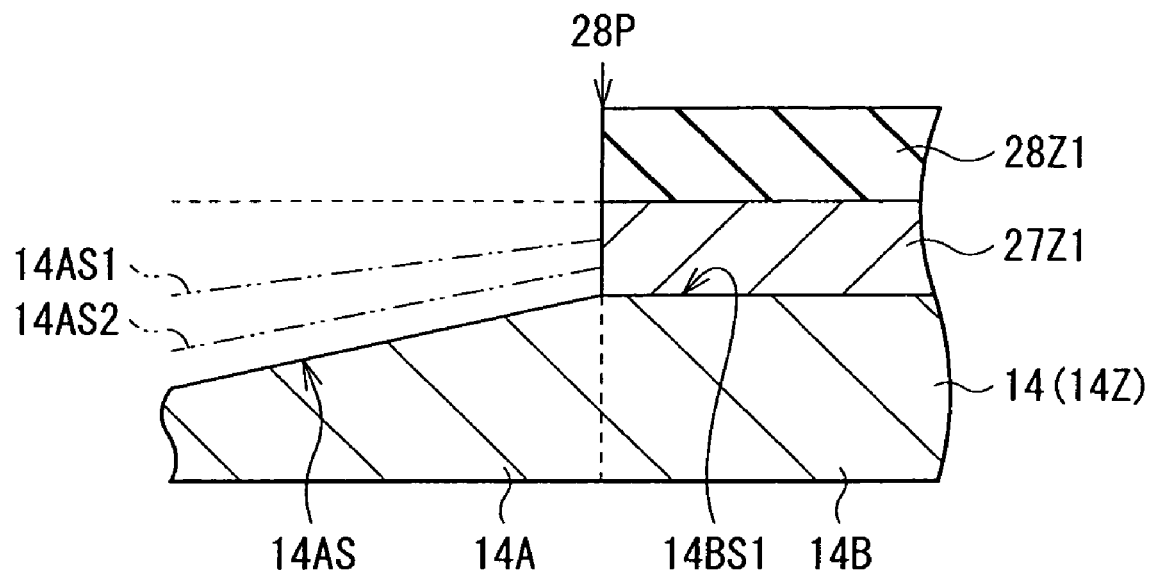
FIG. 15 is a conceptual diagram for explaining a process of forming a front end part of a main magnetic pole layer.

As described above, in the method of manufacturing the thin film magnetic head 100 of the embodiment, the patterned nonmagnetic layer 28Z1 is formed on the nonmagnetic layer 27Z covering the magnetic layer 14Z which will become the main magnetic pole layer 14. After that, the nonmagnetic layer 28Z1 is used as a mask and the magnetic layer 14Z is milled together with the nonmagnetic layer 27Z. Consequently, the nonmagnetic layer 27Z functions as a sacrifice layer at the time of performing the milling process, and the start point position of the inclined part 14A of the main magnetic pole layer 14 formed is positioned at high precision. That is, as shown in FIG. 15, a step between the top face (inclined surface) 14AS of the inclined part 14A and the surface 14BS1 of the flat part 14B coupled to the inclined part 14A is difficult to appear. In addition, when the nonmagnetic layer 27Z functions as a sacrifice layer, the position in the depth direction of the inclined face 14AS and the inclined angle can also be easily controlled. FIG. 15 shows an example showing the process of forming the front end part 14A. The broken line expresses the top face position of the nonmagnetic layer 27Z before the milling process, and alternate long and two short dashes lines show the positions of milled surfaces 14AS1 and 14AS2 during formation.

Figure 16:
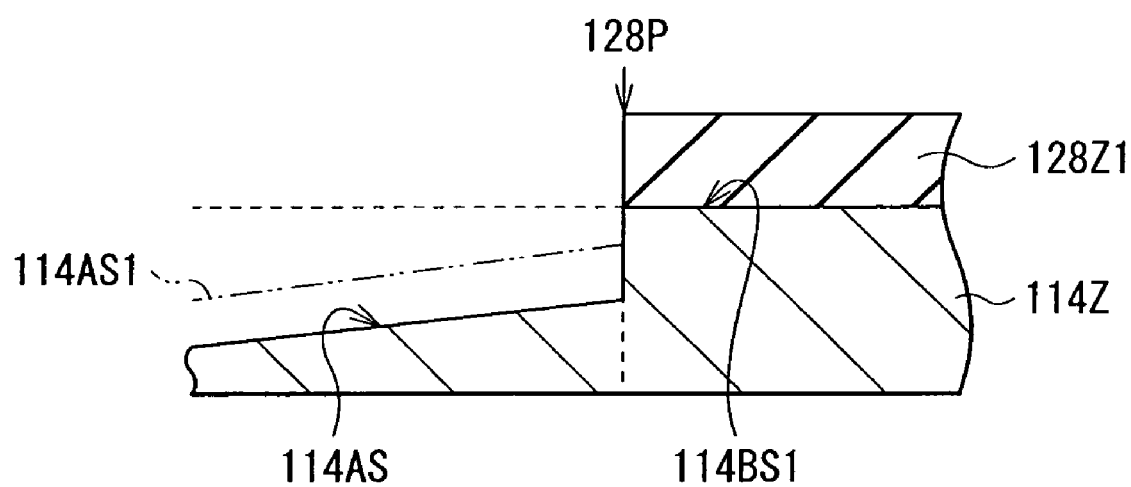
FIG. 16 is a conceptual diagram for explaining a process of forming the main magnetic pole layer in a method of manufacturing a conventional thin film magnetic head.

On the other hand, in the case where only the nonmagnetic layer 128Z1 made of alumina, resist, or the like is provided on the magnetic pole layer 114Z without providing the nonmagnetic layer 27Z, when the milling process is performed on the magnetic pole layer 114Z using the nonmagnetic layer 128Z1 as a mask, the state as shown in FIG. 16 is obtained. Specifically, as shown in FIG. 16, in an edge position 128P of a nonmagnetic layer 128Z1, a relatively large step tends to be created between a top face (inclined face)114AS of an inclined part and a surface 114BS of a flat part coupled to the inclined part. This is because removal of the magnetic layer 114Z progresses simultaneously with start of the milling process, and a milled surface 114AS1 is formed.

In the embodiment, the nonmagnetic layer 27Z functions as a sacrifice layer, so that predetermined inclination angles can be given to the milled surfaces 14AS1 and 14AS2 before the magnetic layer 14Z in the position corresponding to the edge position 28P is removed. Therefore, the inclined surface 14AS is formed at a desired inclination angle in a desired position. In particular, in the case where the nonmagnetic layer 27Z is made of a material whose etching rate in the milling process such as ion milling is lower than that of the magnetic layer 14Z, time allowance for the milled surfaces 14AS1 and 14AS2 to reach the magnetic layer 14Z in the edge position 28P increases. Consequently, fine adjustment of the inclination angle of the inclined surface 14AS can be performed more easily. As a result, the thin film magnetic head 100 obtained has the main magnetic pole layer 14 having high precision dimensions, the leak magnetic flux in the recording operation is reduced, and the recording magnetic field of higher magnetic flux density can be emitted toward the magnetic recording medium 201.

In addition, in the embodiment, after formation of the inclined part 14A, by the etching process using the mask pattern M2, first, the gap layer 16 and the nonmagnetic layer 28A in the area corresponding to the opening M2K are removed. After that, the nonmagnetic layer 27Z1 is selectively removed by the milling process using the mask pattern M2 to expose the flat part 14B in the main magnetic pole layer 14. Consequently, the flat part 14B is hardly removed and an over-milling amount in the depth direction in the flat part 14B can be suppressed to 40 nm or less. On the other hand, when the nonmagnetic layer 27Z1 is removed together with the gap layer 16 and the nonmagnetic layer 28Z1 by the milling process or the like, the possibility that the flat part 14B is also partly removed by over-milling is high. Examples of the cause are that the etching rate of the nonmagnetic layer 27Z1 and the main magnetic pole layer 14 is sufficiently higher than that of the gap layer 16 and the nonmagnetic layer 28Z1, and that he thickness of the nonmagnetic layer 28Z1 after formation of the inclined part 14A is not constant. On the other hand, in the present invention, only the nonmagnetic layer 27Z1 whose thickness is known is removed by the milling process. Consequently, it is easy to control the milling amount, and the over-milling amount can be suppressed to the minimum. Therefore, a part replaced by the auxiliary magnetic pole layer 17 made of the material having relatively low saturated magnetic flux density, in the main magnetic pole layer 14 made of relatively high saturated magnetic flux density becomes small, and decrease in the magnetic flux of the recording magnetic field can be avoided.

In the embodiment, both of the thin film coils 10 and 21 are provided. The invention is not always limited to the embodiment but only the thin film coil 21 may be provided. In this case, the thin film coil 10 and the insulting layers 11 to 13 for burying the thin film coil 10 are unnecessary. In this case as well, similar effects can be obtained.

An example of the present invention will now be described.

In the example, the thin film magnetic head 100 having the top-yoke-type structure (refer to FIGS. 3 to 5) described in the foregoing embodiment was manufactured (the number of "n": n=62). The material of the main magnetic pole layer 14 was an alloy of cobalt, iron, and nickel, the material of the nonmagnetic layer 27 was ruthenium, and the material of the nonmagnetic layer 28 and the gap layer 16 was $Al_2O_3$. Further, an adhesive layer made of titanium was provided between the nonmagnetic layers 27 and 28, and between the nonmagnetic layer 27 and the main magnetic pole layer 14. The main magnetic pole layer 14, the nonmagnetic layers 27 and 28, and the adhesive layer were formed by sputtering. The gap layer 16 was formed by ALD (atomic layer deposition). The ALD is a method capable of forming an oxide film made of $Al_2O_3$ or the like, a nitride film, a metal film, or the like extremely thinly and densely under high-temperature condition of 150° C. or higher. The method is widely used in the manufacturing field in which physical properties such as withstand voltage are strictly required (for example, see "ALD (atomic layer deposition) apparatus", Techscience Ltd., Internet URL: http://techsc.co.jp/products/mems/AL-D.htm). In the example, the step (over-milling amount) in the thickness direction between the surfaces 14BS1 and 14BS2 in the flat part 14B of the main magnetic pole layer 14 was examined, and the result shown in Table 1 was obtained. Table 1 shows an average value, a standard deviation, and a value obtained by dividing the average value by the standard deviation.

As a comparative example of the above-described example, a thin film magnetic head was fabricated in a manner similar to the above-described example except that the gap layer 16 and the nonmagnetic layer 28Z1 and, in addition, the nonmagnetic layer 27Z1 were removed in a lump by the milling process (the number of "n": n=62). Similar examinations were performed on the comparative example, and the result shown in Table 1 was obtained.

TABLE 1

| n = 62 | Step in flat part in main magnetic pole layer | | |
| --- | --- | --- | --- |
| | Average value (nm) | Standard deviation (nm) | Standard deviation/average value (%) |
| Example | 29.9 | 5.1 | 17.16 |
| Comparative example | 83.3 | 24.2 | 28.99 |

As shown in Table 1, the example shows a better result in each of items. It was therefore confirmed that the thin film magnetic head of the present invention can obtain a more preferable write characteristic.

The present invention has been described above by the embodiment and the examples. The invention is not limited to the embodiments but can be variously modified. For example, although the composite head has been described as the structure of the thin film magnetic head in the foregoing embodiment, the invention is not always limited to the composite head. The perpendicular magnetic write head of the present invention can be also applied to a write only head having an induced magnetic transducer for writing and a write/reproduction head having an induced magnetic transducer for writing and reproduction. Obviously, the perpendicular magnetic write head of the present invention can be also applied to a head having a structure in which a stack order of a device for writing and a device for reading is inverted.

In the foregoing embodiment, the method of manufacturing the perpendicular magnetic write head has been described as an example. The method of forming a metal layer pattern of the invention is not limited to the above but can be also applied at the time of forming a metal layer pattern in which an area having the inclined surface and an area having a flat surface mixedly exist.

The correspondence relation between reference numerals and the components of the embodiment will be described as follows.

| | |
| --- | --- |
| 1 | substrate |
| 2, 11 to 13, 20, 22 | insulating layers |
| 3 | bottom read shield layer |
| 4 | shield gap film |
| 5, 7 | top read shield layer parts |
| 6, 15, 19 | nonmagnetic layers |
| 8 | reproduction device (MR device) |
| 9 | isolation layer |
| 10 | thin film coil |
| 14 | main magnetic pole layer |
| 114A | inclined part |
| 14AS | inclined surface |
| 14B | flat part |
| 16 | gap layer |
| 17 | auxiliary magnetic pole layer |
| 18 | write shield layer |
| 23 | return yoke layer |
| 24 | overcoat layer |
| 25, 26 | connection parts |
| 27, 28 | nonmagnetic layers |
| 29 | stack structure |
| 30 | top read shield layer |
| 100 | thin film magnetic head |
| 100A | reproduction head part |
| 100B | write head part |
| 200 | casing |
| 201 | magnetic recording medium |
| 202 | head arm assembly (HAA) |
| 203 | head gimbals assembly (HGA) |
| 204 | arm |
| 205 | drive unit |
| 206 | slider |
| 207 | suspension |
| 208 | fixed shaft |
| 209 | bearing |
| 210 | spindle motor |
| 220 | air bearing surface |

What is claimed is:

1. A method of manufacturing a perpendicular magnetic write head, comprising:

forming a magnetic layer on a substrate;

forming a first nonmagnetic layer and a second nonmagnetic layer in order on the magnetic layer, with different materials;

forming a first mask pattern on the second nonmagnetic layer and removing, through a first etching process, the second nonmagnetic layer in a region which is not covered with the first mask pattern, thereby forming a pattern of the second nonmagnetic layer while leaving the first nonmagnetic layer; and removing the first mask pattern, and selectively performing a first milling process on the first nonmagnetic layer and the magnetic layer with the pattern of the second nonmagnetic layer as a mask, so as to remove all of the first nonmagnetic layer in an exposed region which is not covered with the pattern of the second nonmagnetic layer and to dig down the magnetic layer in the exposed region, thereby forming a main magnetic pole layer having an inclined part which is getting thinner with distance from an edge position of the pattern of the second nonmagnetic layer.

2. The method of manufacturing the perpendicular magnetic write head according to claim 1, wherein the first nonmagnetic layer is made of a metal, the second nonmagnetic layer is made of an insulting material, reactive ion etching is performed as the first etching process, and ion milling is performed as the first milling process.

3. The method of manufacturing the perpendicular magnetic write head according to claim 1, wherein an etching rate in the first milling process of the first nonmagnetic layer is lower than that of the magnetic layer.

4. The method of manufacturing the perpendicular magnetic write head according to claim 2, wherein the magnetic layer is made of a metal magnetic material containing at least one of iron (Fe), nickel (Ni), and cobalt (Co),
the first nonmagnetic layer is made of a metal containing at least one of ruthenium (Ru) and chromium (Cr), and
the insulating material forming the second nonmagnetic layer contains aluminum oxide (Al2Ox).

5. The method of manufacturing the perpendicular magnetic write head according to claim 1, further comprising:
forming an insulating layer so as to cover at least the inclined part of the main magnetic pole layer;
forming a second mask pattern having an opening in a region corresponding to the pattern of the second nonmagnetic layer and covering the other region;
removing, through a second etching process, the insulating layer and the pattern of the second nonmagnetic layer in the region which is not covered with the second mask pattern;
exposing the main magnetic pole layer by selectively removing the first nonmagnetic layer by a second milling process with the second mask pattern as a mask; and
removing the second mask pattern and forming a write shield layer and an auxiliary magnetic pole layer, the write shield layer covering a region corresponding to the inclined part of the main magnetic pole layer, in the insulating layer, and the auxiliary magnetic pole layer being isolated from the write shield layer to cover an exposed surface of the main magnetic pole layer.

6. The method of manufacturing the perpendicular magnetic write head according to claim 5, wherein wet etching or reactive ion etching is performed as the second etching process, and ion milling is performed as the second milling process.

7. The method of manufacturing the perpendicular magnetic write head according to claim 1, wherein the first nonmagnetic layer is made of a material whose etching rate in the first etching process is higher than that of the first nonmagnetic layer by ten or more times.

8. A perpendicular magnetic write head having a recording medium facing surface that faces a magnetic recording medium and for recording magnetic information onto the magnetic recording medium, the perpendicular magnetic write head comprising:
a main magnetic pole layer having an ane-end exposed from the recording medium facing surface and including an inclined part whose thickness increases with distance from the recording medium facing surface, and a flat part coupled to the inclined part on a side opposite to the recording medium facing surface, and guiding a magnetic flux to the magnetic recording medium; and
a stack structure disposed in a position closest to the recording medium facing surface, on the flat part of the main magnetic pole layer, and including a first nonmagnetic layer and a second nonmagnetic layer made of different materials in order from a side of the main magnetic pole layer.

9. The perpendicular magnetic write head according to claim 8, further comprising:
an insulating layer covering at least the inclined part;
a write shield layer covering a region corresponding to the inclined part of the main magnetic pole layer, on the insulating layer; and
an auxiliary magnetic pole layer isolated from the write shield layer and coupled to the main magnetic pole layer on the side opposite to the recording medium facing surface, of the stack structure.

10. The perpendicular magnetic write head according to claim 8, wherein the main magnetic pole layer is made of a metal magnetic material containing at least one of iron (Fe), nickel (Ni), and cobalt (Co),
the first nonmagnetic layer is made of a metal containing at least one of ruthenium (Ru) and chromium (Cr), and
the second nonmagnetic layer is made of an insulating material containing aluminum oxide (Al2Ox).

11. The perpendicular magnetic write head according to claim 8, wherein the second nonmagnetic layer is made of a material whose etching rate in wet etching process and reactive ion etching process is higher than that of the first nonmagnetic layer by ten or more times.

12. A method of forming a magnetic layer pattern, comprising:
forming a first nonmagnetic layer and a second nonmagnetic layer in order on a magnetic layer, with different materials;
forming a mask pattern on the second nonmagnetic layer and removing, through an etching process, the second nonmagnetic layer in a region which is not covered with the mask pattern, thereby forming a pattern of the second nonmagnetic layer while leaving the first nonmagnetic layer; and
removing the mask pattern and, after that, selectively performing a milling process with the pattern of the second nonmagnetic layer as a mask on the first nonmagnetic layer and the magnetic layer, so as to remove all of the first nonmagnetic layer in an exposed region which is not covered with the pattern of the second nonmagnetic layer and to dig down the magnetic layer in the exposed region.

13. The method of forming the magnetic layer pattern according to claim 12, wherein the first nonmagnetic layer is made of a metal, the second nonmagnetic layer is made of an insulating material, reactive ion etching is performed as the etching process, and ion milling is performed as the milling process.

14. The method of forming the magnetic layer pattern according to claim 12, wherein the magnetic layer is made of a metal containing at least one of iron (Fe), nickel (Ni), and cobalt (Co),
the first nonmagnetic layer is made of a metal containing at least one of ruthenium (Ru) and chromium (Cr), and
the second nonmagnetic layer is made of an insulating material containing aluminum oxide (Al2Ox).

15. The method of forming the magnetic layer pattern according to claim 12, wherein the second nonmagnetic layer is made of a material whose etching rate in the etching process is higher than that of the first nonmagnetic layer by ten or more times.

* * * * *